(12) United States Patent
Karlsson

(10) Patent No.: US 6,306,188 B1
(45) Date of Patent: Oct. 23, 2001

(54) FILTER BAGS HAVING DISTANCE ELEMENTS OF PROGRESSIVELY DIFFERING LENGTHS, AND METHOD OF FORMING SAME

(75) Inventor: Niclas Karlsson, Södertälje (SE)

(73) Assignee: Camfil AB (SE)

( * ) Notice: Subject to any disclaimer, the term of this patent is extended or adjusted under 35 U.S.C. 154(b) by 0 days.

(21) Appl. No.: 09/286,854

(22) Filed: Apr. 6, 1999

(30) Foreign Application Priority Data

Apr. 9, 1998 (SE) .................................................. 9801249

(51) Int. Cl.⁷ .................................................. B01D 46/02
(52) U.S. Cl. ........................................... 55/381; 55/DIG. 5
(58) Field of Search ........................ 55/381, 382, DIG. 5, 55/341.1, 379

(56) References Cited

U.S. PATENT DOCUMENTS

| | | | |
|---|---|---|---|
| 5,156,661 | * | 10/1992 | Adiletta .................................. 55/381 |
| 5,215,609 | * | 6/1993 | Sanders ............................. 55/DIG. 5 |
| 5,891,208 | * | 4/1999 | Gil ......................................... 55/482 |
| 5,928,396 | * | 7/1999 | Choi ..................................... 55/379 |
| 6,010,548 | * | 1/2000 | Burkhead et al. ..................... 55/378 |

\* cited by examiner

*Primary Examiner*—Duane S. Smith
(74) *Attorney, Agent, or Firm*—Hayes, Soloway, Hennessey, Grossman & Hage, PC

(57) ABSTRACT

Method for the fabrication of filters with deep folds connecting of opposed sides of the filter to prevent blow-out, by welding intermediate distance elements to the filter material on each side. The distance elements include bridges and/or connections between parts welded to the difference filter sides. The bridges are extendable to different lengths at different locations in the filter.

6 Claims, 7 Drawing Sheets

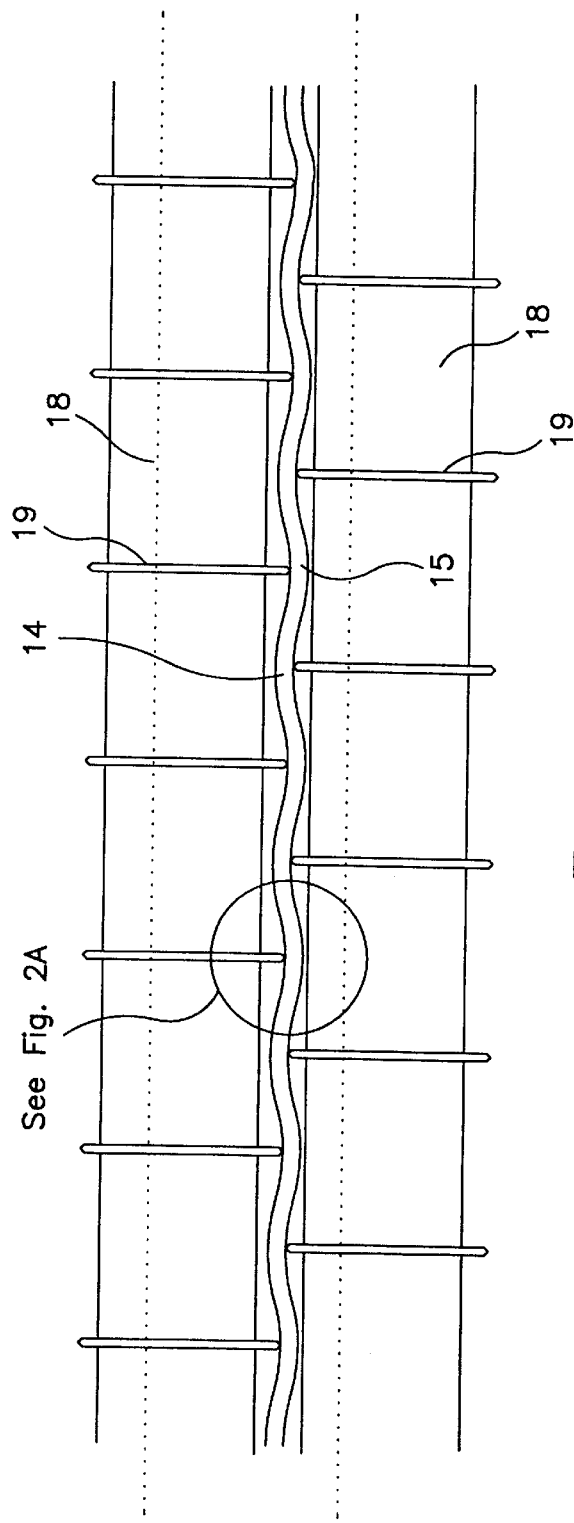
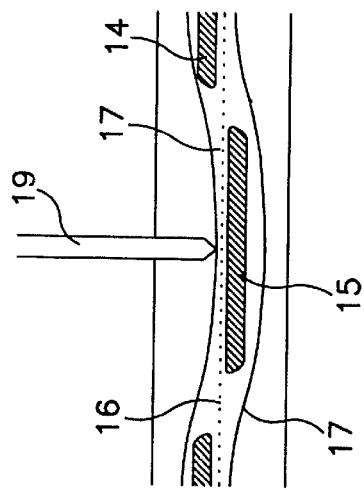
FIG. 2
FIG. 2A

FILTER BAGS HAVING DISTANCE ELEMENTS OF PROGRESSIVELY DIFFERING LENGTHS, AND METHOD OF FORMING SAME

BACKGROUND OF THE INVENTION

In order to be able to filter large amounts of air in for instance, air conditioning installations, it is known to use folded filters with a very great depth. These filters are sometimes called bag-filters since they can be considered as a group of bags located adjacent one another. In addition to achieving a large area for the filter material in this way, the filter bags can be folded for transport and storage, which in particular results in transport savings since the filter in the shape when used is particularly bulky. As a result of the large area of the separate bags these however have a tendency to inflate so that the triangular cross section shape desired for a good flow is easily lost. In order to counteract this it is known to sew fast threads cross-wise through the bag. While this has no negative effect on the foldability of the filters, the sewing of threads in the filter material may however easily lead to damage either during sewing or later when the filter is subjected to a load. Primarily these damages may result in leakages, which is why glue usually is applied as a sealant. In other words the number of steps required for the fabrication of these filters and in particular the manual effort involved is comparatively large. Furthermore, the use of glue makes the material non-homogeneous which is a disadvantage when it comes to recycling.

In view of the above problems of filters of this kind the object of the invention is to achieve a filter and a fabrication method that can be executed simpler, faster, and with a more complete homogeneity of material.

BRIEF SUMMARY OF THE INVENTION

In accordance with the invention the above is achieved by welding distance elements between the opposed filter material sides of the filter bag, that upon use of the filter can be extended to different degrees at different locations in the filter. In one embodiment the distance elements can consist of sheet material with openings, for instance in the shape of a ladder but where the separate steps rather than being entirely straight across become increasingly bent or V-shaped. Since the connecting steps are longer in one end the longitudinal parts of the ladder can be pulled apart to different degrees so that a narrowing or widening ladder is obtained, dependent on in which direction it is viewed. By welding one longitudinal part of the ladder to the filter material on one side of the filter bag and the other longitudinal part of the ladder to the other, the distance elements can during welding be arranged with the longitudinal parts at the same distance, while upon erection of the filter the separate steps or connections are extended so that the intended shape of the filter is defined and maintained. The welding of the distance elements can take place with the filter material and the distance elements lying essentially flat and close to one another which facilitates relative positioning before welding. In addition to the simple welding method obtained in this way for the welding of the distance elements it is also easy to adapt the fabrication method to different width bags since one quite simply changes the distance elements to one with shorter or longer extendable connections.

By arrangement of a distance element over the entire depth of the filter bag it also is possible to arrange the desired number of connections between the opposed sides of the bag by connecting alternating "longitudinal ladder parts" to the sides of the filter bag. In this way the distance element connection will not extend perpendicular to the filter material but instead a zigzag shaped framework will be obtained with obliquely or angled connections or bridges between the sides of the filter fold.

In known filters where the distance elements extend straight through the filters, and against the filter material, when the filter is subjected to a load, depressions are easily obtained corresponding to the locations of the cross connections. This means that the outlet channels for the filter become somewhat more narrow than the inlet channels, which possibly must be compensated by making the transverse distances shorter. It is possible according to the present invention possible to control deviation from the desired plane areas due to the flexibility of the filter material. Since the distances elements of the invention run in zigzag fashion the filter has a tendency to form a wave shape but with a more constant width in the cross section. This wave shape can be used to stiffen the filter and is preferably arranged cross-wise in relation to the flow direction. By making the bags in this way the flow conditions on the inlet side as well as on the outlet side can be made very uniform. The wave shape can also be used to increase the filter area.

In accordance with one aspect of the invention the welded distance elements are arranged in relation to the filter material either running lengthwise or cross-wise in the filter or in other directions or patterns or only in the shape of points. In all cases the connections can be made shorter close to the bottom and longer in the upper ends of the filter bags despite the welding being carried out with the filter material webs on a constant distance from each other.

The material forming the distance elements may have the same chemical composition as the filter material but may be constituted by a comparatively thin foil from which material has been punched so that bent, V-shaped or zigzag shaped foil bands are formed. Also, other shapes may give the same result.

Since the invented method allows continuous machine fabrication of filter bags by means of welding, good quality is obtained at a low cost with a minimum of manual work.

While welding is preferred, other types of binding, as for instance gluing, seaming, heat treatment, etc., may be employed. Likewise the distance elements may have different shape as long as they in use result in the desired differing length connections. The welding of the distance elements to the sides of the filter need to be along lines but may instead be in points. If the number of cross connections that are required are few in number or if the cross connections are widely spread the distance elements or the web also may include parts that via easily separable extra connections are connected to the parts that are to be welded to the filter material and thereby maintain the distance elements in the right position until its welded. When the welding has taken place the separable part may be drawn loose from the welded parts and removed from the filter.

The distance elements can be comprised of filter material, thin foil, net or a nonwoven material from which has been punched, cut, burnt, or in some other suitable way connections with different lengths have been achieved.

BRIEF DESCRIPTION OF THE DRAWINGS

Additional advantages and characteristics of the invention are apparent from the following description of preferred embodiments of the invention shown in the drawings. In the drawings

FIG. 2 a detail side view of the machine and the fabrication respectively;

DETAILED DESCRIPTION OF PREFERRED EMBODIMENTS

Figure 1:
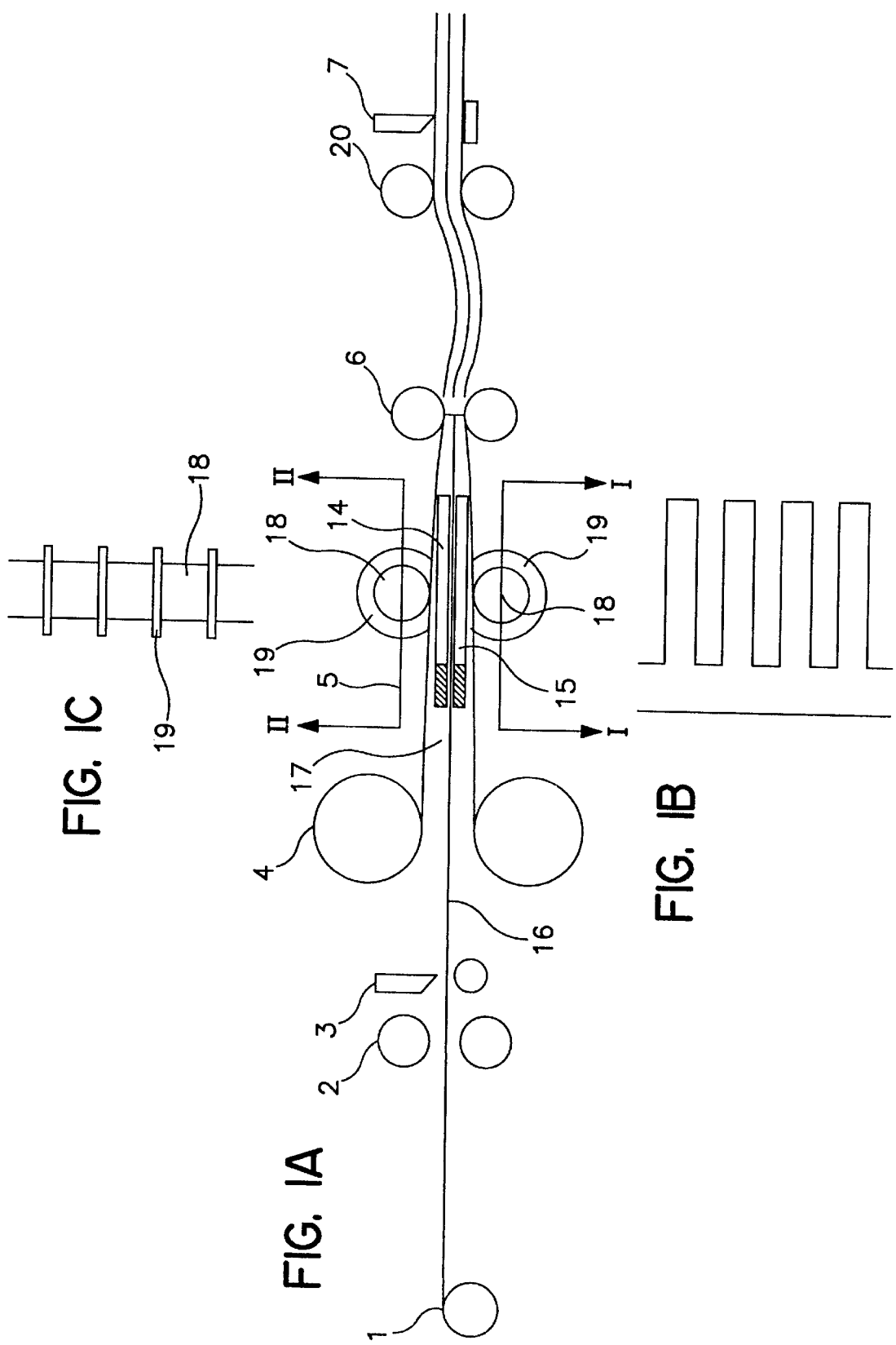
FIG. 1a shows a side view machine for the fabrication of a filter in accordance with the invention.
FIGS. 1b and 1c are views taken along I—I and II—II.

In the machine shown in FIGS. 1a–1c for the fabrication of filters, the filter material 17 is fed from two rolls 4 towards a welding station 5. From an additional roll 1 distance element material 16 of foil sheet material is fed between the two rolls 2 that mill or punch away rectangular openings 10 (see FIG. 3), so that the distance element material temporarily is in the shape of an endless net or band constituted of longitudinal strips 8 and cross sections with intermediate openings 10. As an extension of the left edge of the cross connections 9 a cut 11 extends a short distance, corresponding to slightly more than the width of the connection 9, into strips 8. A subsequent punch 3 then cuts slot 12 in the strips 8 producing an extension 13 of the cross connections 9 so that U-shaped connections are produced between adjacent strips. By letting the punch 3 cut different depths, differing total lengths for the U-shaped connections is achieved. The part of the distance elements material 17 shown in FIG. 3 corresponds to a filter bag with long connections to the right adjacent the open end of the filter bag in the welding station 5. Dollies 14 and 15 are arranged above and below the distance elements material 16. The dollies have as is apparent from FIG. 1b and FIG. 2 the shape of crosswise arranged combs with broader openings between laterally spaced teeth. The filter elements material 17 is fed past the dollies 14, 15 in an over and under fashion. Above and below respectively the fed filter material 17 are arranged weld rolls 18 with flanges 19. The flanges 19 of the rolls 18 as well as the "teeth" of the dollies are located corresponding to the longitudinal strips 8 of the distance material. The flanges 19 press the filter material 17, against the dollies 14 and 15 with the distance elements material therebetween. Ultrasonics are directed to the rolls so that distance elements material 17 and filter material 16 are welded together along the strips 8.

After welding the connected material is drawn from the dollies, by rolls 6 to a combined separating and welding station 7 where the material step-wise is fed forwards by rolls 20 and is welded along the edges and also separated into individual bags. That is, the bags are welded at the bottom at the same time as they are cut away from the upper end of the next filter bag. In the illustrated case the filter bags are made with their open ends turned in the running direction of the filter material during fabrication either forwards or backwards depending on the orientation of the distance elements.

When the rolls are stopped during the welding and cutting operations the material hangs in a bow between the rolls 6 and 20.

Figure 4:
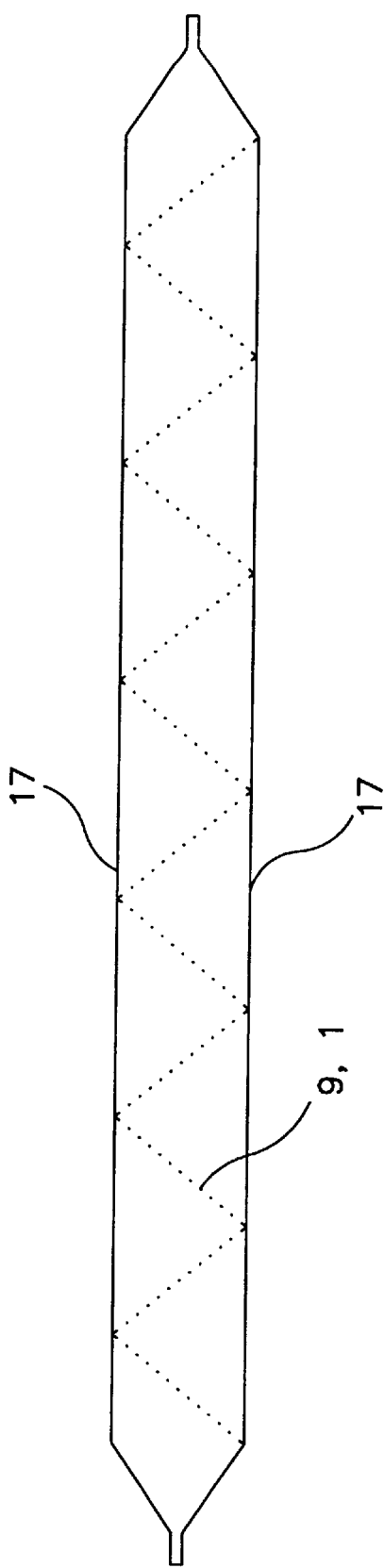
FIG. 4 a section through a finished filter.

Since the U-shaped connections have different lengths depending on how deeply they are situated in the filter its triangular cross section is supported in the desired way. In use connections of the filter extend and straighten with varying lengths so that the cross section shown in FIG. 4 is obtained.

Figure 5:
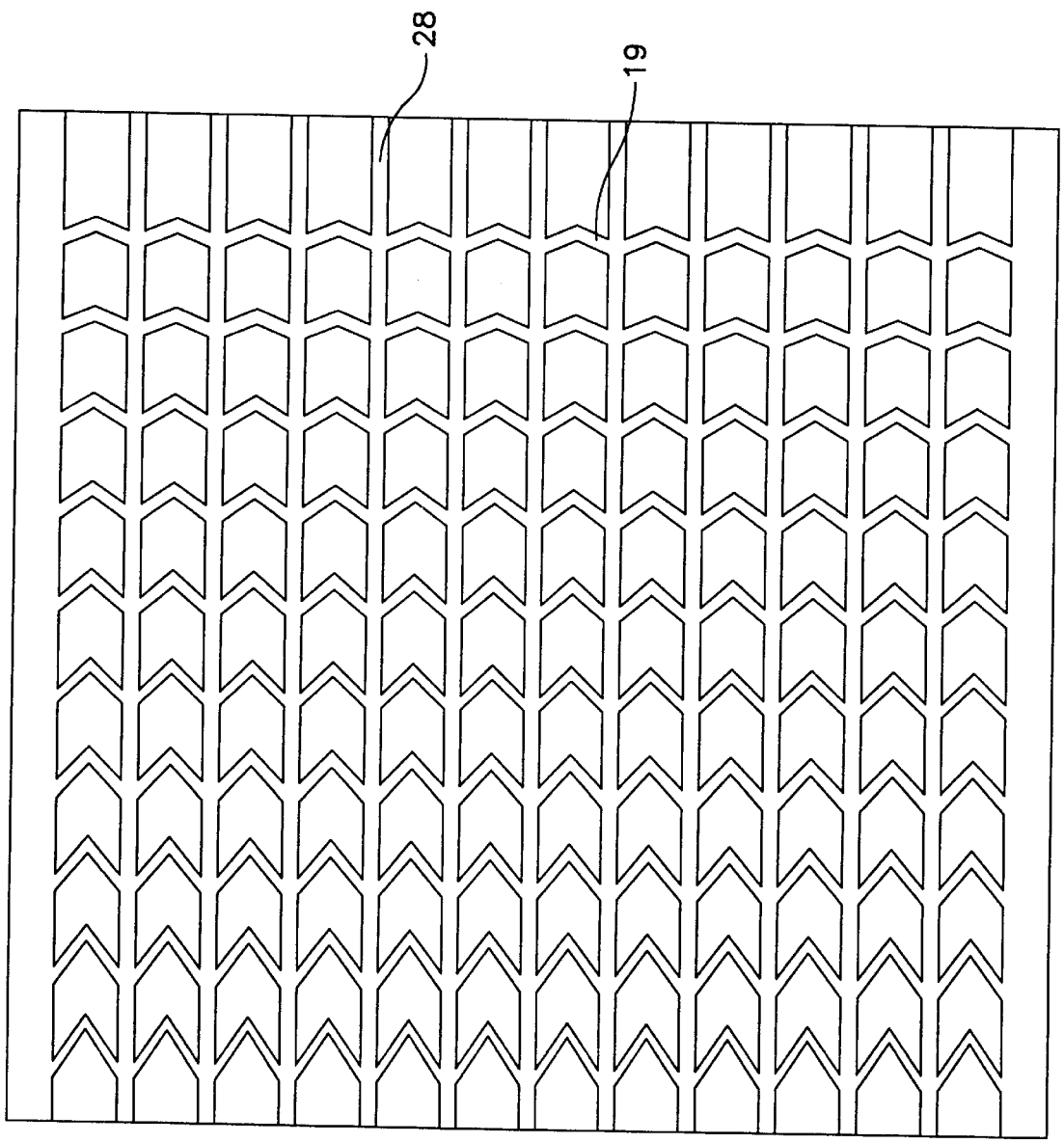
FIG. 5 a view similar to FIG. 3 of another embodiment of the distance element.

In FIG. 5 another distance element according to the invention is described constituted of longitudinal strips 28 connected by V-shaped cross connections 19. The V-shaped connections 19 are progressively differently angled. At the narrow end of the angle is very obtuse and consequently the length of the connection between the strips is only slightly longer than the unexpanded distance between the strips.

Toward the under section of the filter, i.e., the open end, the angles become sharper, thereby increasing the length of the connections 19, allowing for greater expansion of the filter bag. The longitudinal strips 28 run in the feed direction of the filter material 17 and the distance elements material 16 can be used in the installation described in connection with FIGS. 1 and 2.

Figure 3:
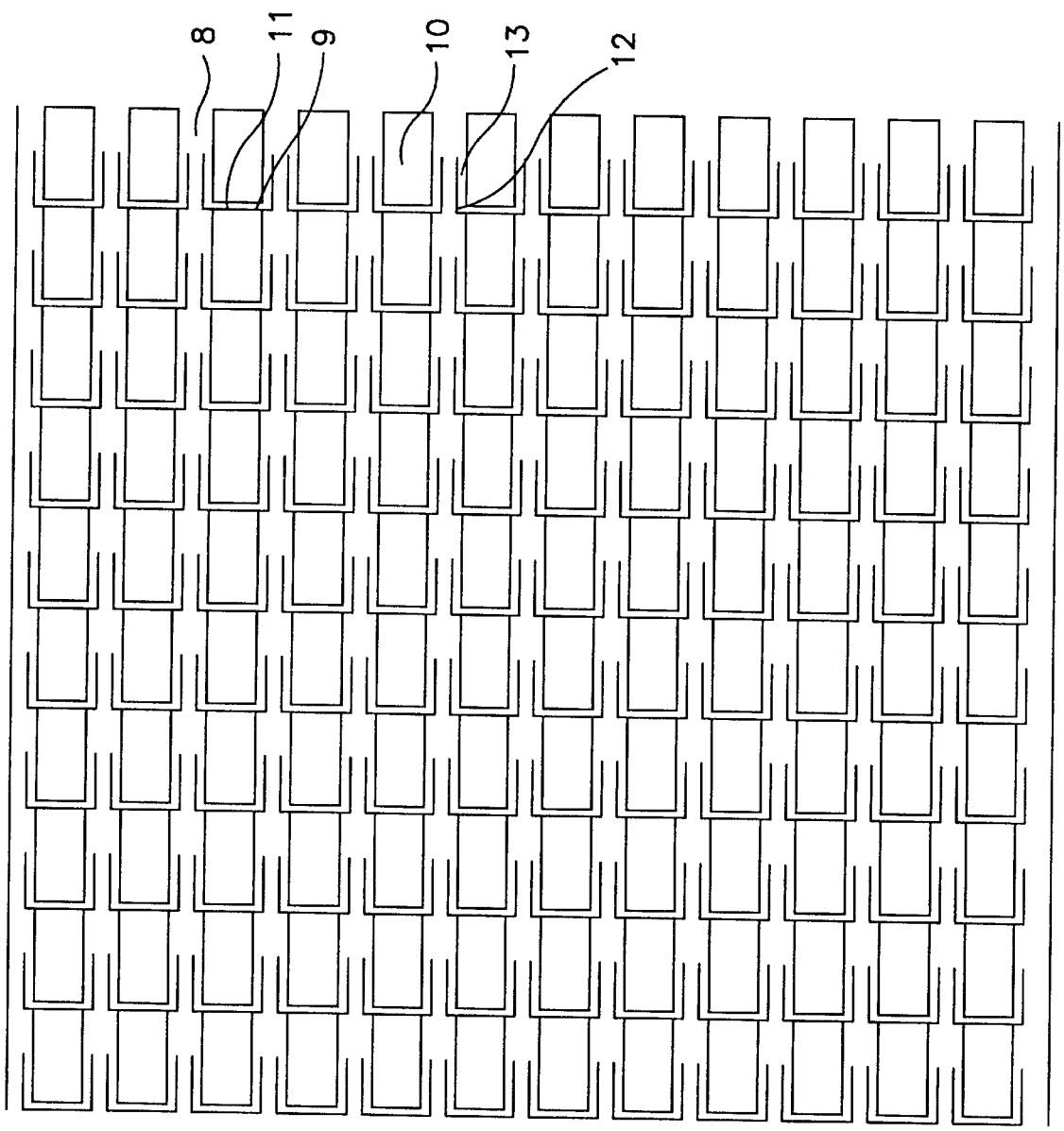
FIG. 3 a top view of a distance element according to the invention.

In order to ensure that the longitudinal strips remain in the right position the distance elements 16 may partly be subjected to a certain amount of tension in the lengthwise direction with the transverse uncut connection providing lateral support at the parts that will correspond to the bottoms of the filter bags, that is furthest to the left in FIG. 3 and furthest to the right in FIG. 5.

As is apparent from FIGS. 3 and 5, the distance element material 16 may be connected to the filter material 17 evenly distributed and comparatively close to the surface of the filter thereby obtaining good continuity throughout the filter thus yielding good flow conditions. The internal connections will result in little flow resistance so that flow conditions are not affected to any significant degree.

Figure 6:
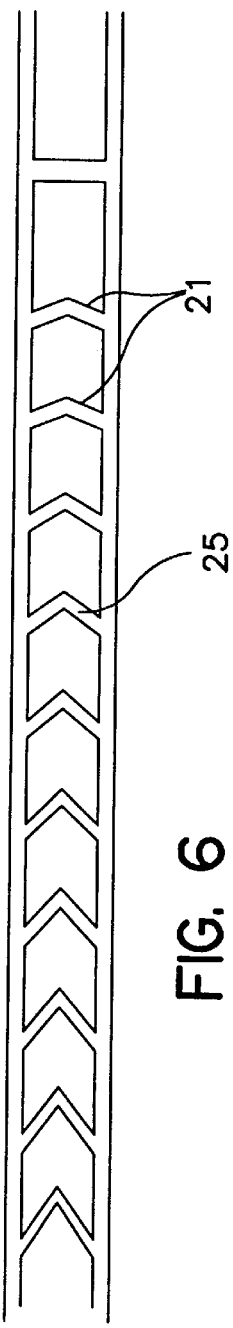
FIG. 6 a view similar to FIG. 3 of an additional version of the distance element in accordance with the invention.
Figure 7:
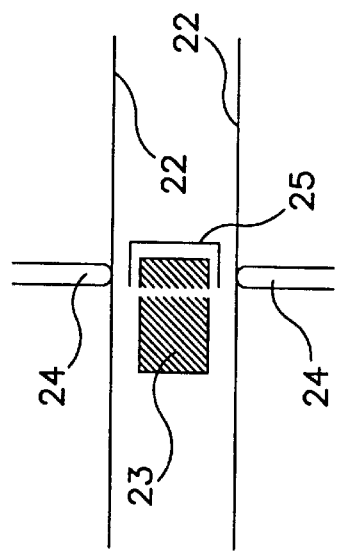
FIG. 7 a cross-sectional view of a mounted filter.
Figure 8:
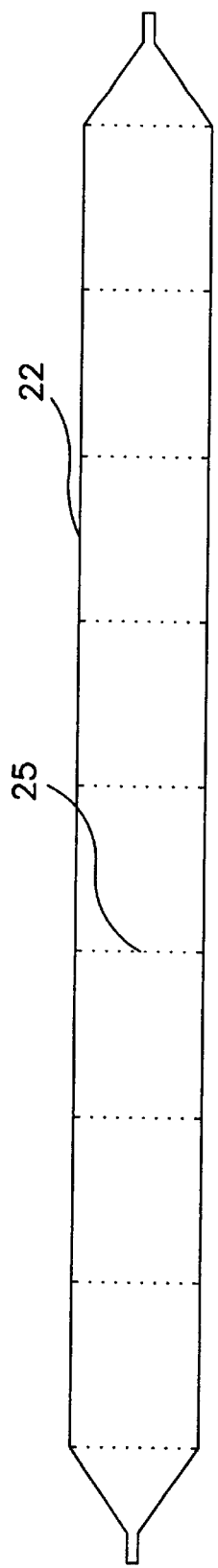
FIG. 8 a cross section of the filter of FIG. 7.

As an alternative to the above described fabrication method one can instead weld bands 21 of the distance elements with a shape corresponding to that shown in FIG. 6 to opposite sides of the filter material 22, for instance by being bent to a half circular channel that is guided along a dolly 23 at the same time as welding takes place with two rolls 24. The cross connections 25 of the bands 21 then define the distance between the sides of the filter bag. This gives the appearance shown in FIG. 7 where the distance connections are perpendicular to the filter material.

Figure 9:
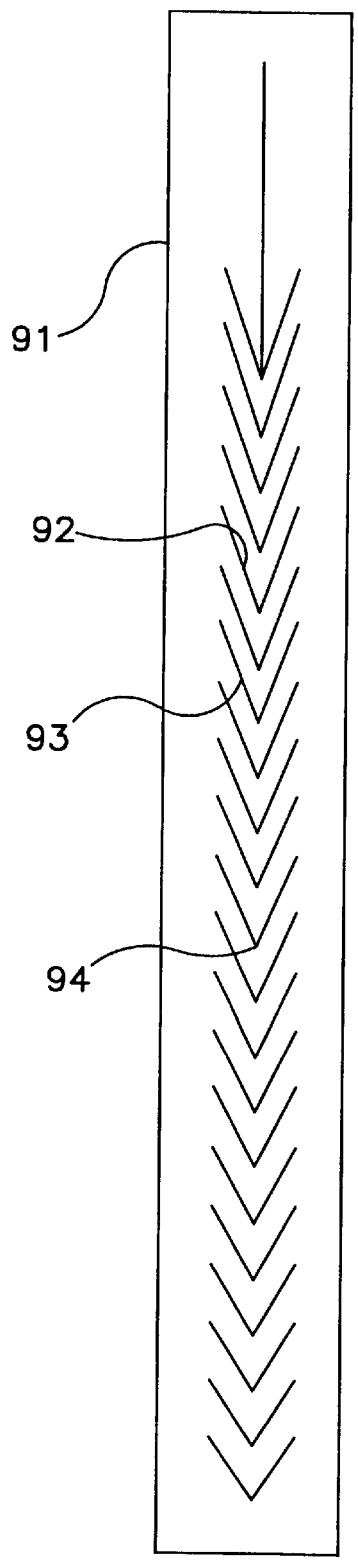
FIGS. 9 and 10 view similar to FIG. 3 of two additional distance elements made according to the invention.

With the method described with reference to FIG. 6, bands 91 punched or cut as is shown in FIG. 9 may be used. Here cross connections 92 having different lengths are achieved due to different angles of the cuts 93. Since the cross sections 92 are connected to each other by a centrally arranged bridge 94 a much more stable strip is obtained facilitating machine mounting.

If desired the central connecting bridge 94 can be used to contract the filter in the closed or narrower end of the filter. Since the filter in the open or upper end is forced open upon mounting in an air conditioner frame, the upper cross connections 92 will pull the central bridge 99 upwards simultaneously pulling the filter upwardly thereby reducing the width by pulling the sides of the filter closer together.

In order to increase the stability of the distance element bands 91 additional bridges may be arranged so that a net like structure is obtained.

In order to allow straightening of the cross connections 92 the bridge 94 or bridges must be interrupted at their top and bottom. This results in a far more controllable and more easily handled distance element considerably facilitating fabrication.

In the part of the distance element located at the top of the filter a longitudinal vertical slot is arranged allowing separation of the edges of the band without reduction of stability. Furthermore small deviations in the vertical position of the distance band at mounting will not be critical. Even where the distance element band is pulled forwards during fabrication the continuous edges and bridging elements will remain stable until welding has been completed and the distance element and filter material are cut into individual filter bags.

Figure 10:
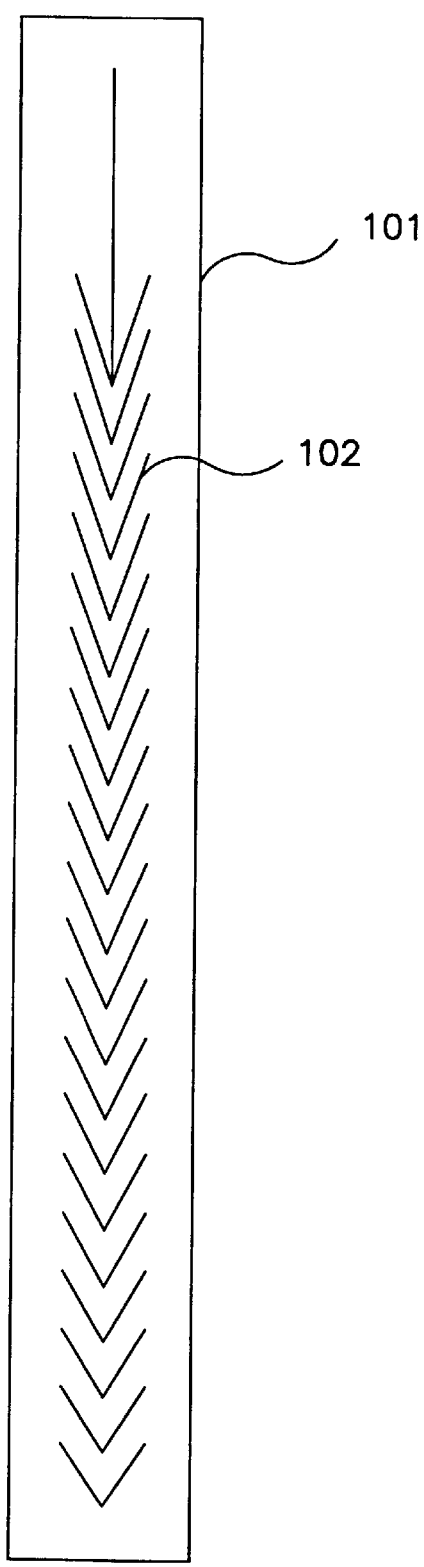

FIG. 10 shows a distance element strip 101 with v-shaped slots 102 but without central bridging.

The present method is not limited to bands running lengthwise; rather the bands also may run transversely in relation to the material webs preferably welding or fixing is intermittent and does not need to be continuous, but may even be arranged as points. Nor do the filter bags have to be arranged in the above described manner but instead the filter bags may be arranged to have their openings towards an edge of the webs.

The bridges or connections in the distance material preferably are shaped taking into consideration how the sides of the filter bags will move at separation from fabrication to mounting. By means of the distance element according to the invention a simple fabrication method providing a large freedom in the choice of the size and shape of filter bags can be achieved.

Since the strips are punched it also is possible that the connection making openings can be detected by for instance optical cells in order to synchronize the strip material with the welding of the filter bags.

What is claimed is:

1. A filter constituted by folds or bags of filter material where the opposed sides of the bags are connected by distance elements, wherein the distance elements are made of sheet material which is welded to both sides of the filter in the fold, said sheet material being punched along curved or angled lines with remaining distance elements between opposed bag sides so that the distance elements due to their curvature can become longer when straightened so that they upon deployment of the filter can be drawn out or extended to a greater length than the distance between the welds at the welding.

2. A filter according to claim 1, wherein the distance elements have differing lengths to provide a narrowing filter cross section.

3. A filter according to claim 1, wherein the distance elements are stamped or punched in a sheet with approximately the same area as the dimensions of the side of the filter bag or fold.

4. A filter according to claim 1, wherein the connections are connected to each other in larger or smaller groups by one or several bridges.

5. A filter according to claim 4, wherein the bridges are in a symmetrical pattern.

6. A filter according to claim 4, wherein the bridges are centrally located.

* * * * *